US009847601B2

(12) United States Patent
Menard

(10) Patent No.: US 9,847,601 B2
(45) Date of Patent: Dec. 19, 2017

(54) ELECTRICAL CONNECTOR

(71) Applicant: DELPHI INTERNATIONAL OPERATIONS LUXEMBOURG S.A.R.L., Bascharage (LU)

(72) Inventor: Pascal Menard, Villepreux (FR)

(73) Assignee: DELPHI INTERNATIONAL OPERATIONS LUXENBOURG S.A.R.L., Luxembourg (LU)

( * ) Notice: Subject to any disclaimer, the term of this patent is extended or adjusted under 35 U.S.C. 154(b) by 0 days.

(21) Appl. No.: 15/242,641

(22) Filed: Aug. 22, 2016

(65) Prior Publication Data
US 2017/0062987 A1 Mar. 2, 2017

(30) Foreign Application Priority Data

Aug. 31, 2015 (FR) ...................................... 15 58059

(51) Int. Cl.
H01R 13/514 (2006.01)
H01R 13/641 (2006.01)
H01R 13/422 (2006.01)
H01R 13/506 (2006.01)
B60R 16/02 (2006.01)
H01R 13/436 (2006.01)

(52) U.S. Cl.
CPC .......... *H01R 13/641* (2013.01); *B60R 16/02* (2013.01); *H01R 13/4223* (2013.01); *H01R 13/4364* (2013.01); *H01R 13/506* (2013.01); *H01R 13/4362* (2013.01); *H01R 2201/26* (2013.01)

(58) Field of Classification Search
USPC ......................................................... 439/752
See application file for complete search history.

(56) References Cited

U.S. PATENT DOCUMENTS 5,746,624 A * 5/1998 Ohsumi ............. H01R 13/6315
439/595
5,887,352 A * 3/1999 Kim ......................... F41G 1/08
42/144
7,281,961 B1 10/2007 Sugiyama et al.
2015/0349449 A1* 12/2015 Zhu ..................... H01R 13/4368
439/752

FOREIGN PATENT DOCUMENTS

EP 978905 A2 10/2004
EP 2124298 A1 11/2009
WO 2011040649 A1 4/2011

* cited by examiner

*Primary Examiner* — Tho D Ta
(74) *Attorney, Agent, or Firm* — Robert J. Myers

(57) ABSTRACT

The invention relates to a connector for motor vehicles. By means of the invention it is possible to cause a pawl and a detecting device the position of this pawl to interact so as to block the displacement of this detecting device when it is displaced from its delivery position into its use position and when the pawl protrudes due to incorrect positioning of a contact or a contact carrier module. To this end, the detecting device blocks the pawl, for example by said pawl being subjected to shear, in the position protruding between two surfaces of the detecting device.

9 Claims, 6 Drawing Sheets

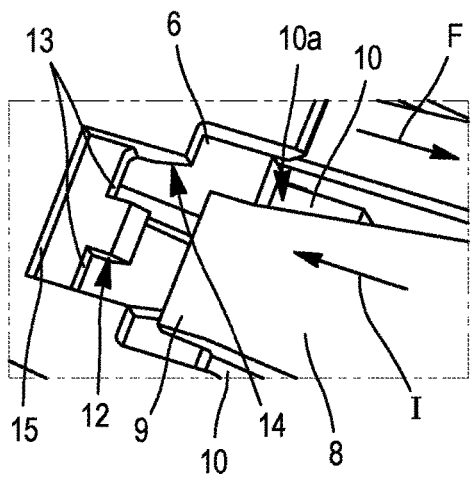
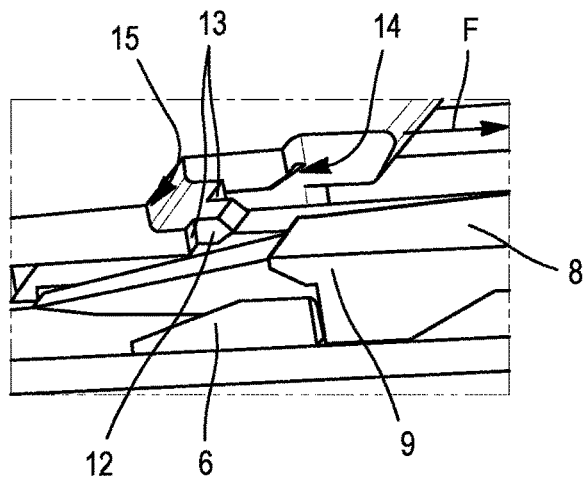
FIG. 7 FIG. 8
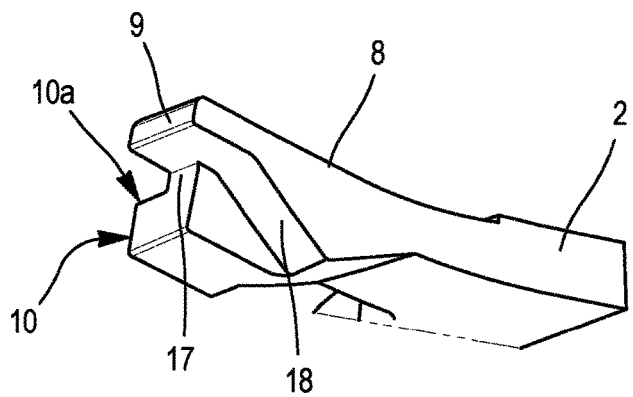
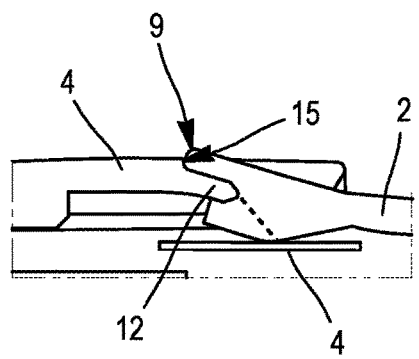
FIG. 9 FIG. 10
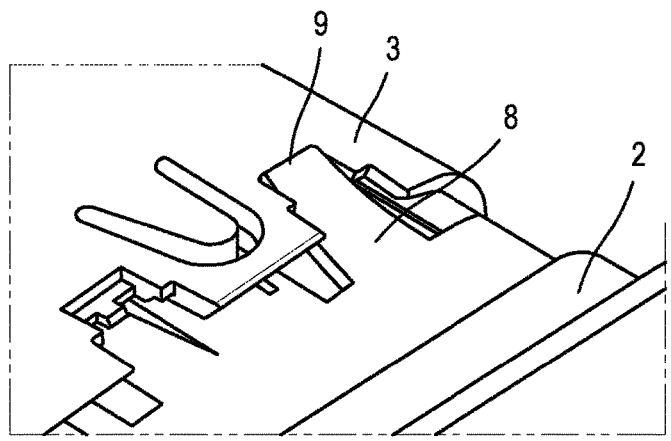
FIG. 11

ELECTRICAL CONNECTOR

CROSS-REFERENCE TO RELATED APPLICATION

This application claims the benefit under 35 U.S.C. §119(a) of Patent Application No. 1558059 filed in the Institut National de la Propriété Industrielle (French Patent Office) on Aug. 31, 2015, the entire disclosure of which is hereby incorporated by reference.

TECHNICAL FIELD OF THE INVENTION

The present invention relates to the field of connectors for motor vehicles. More particularly, the invention relates to a connector for motor vehicles having a housing, comprising at least one pawl, and a detecting device the position of the pawl. The term "housing" is used here in a generic manner. It may equally denote, for example, both a housing to receive contacts and a contact carrier module.

BACKGROUND OF THE INVENTION

In connectors according to the prior art, an external wall which limits the flexion of a pawl and/or a tip covering or extending the end of the pawl beyond its zone of interaction with a detecting device is sometimes provided in order to prevent the pawl from being subjected to a level of stress which is too high in the protruding position which could result in its rupture and/or in order to prevent the pawl from retracting if the detecting device is displaced by force toward its use position. However, this type of device is not always compatible with the small space taken up by the connector.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

A detecting device for detecting the position of the pawl is moveable relative to the housing. More specifically, it may be displaced in a closing direction between a delivery position and a use position (and vice versa in the opposing direction). More specifically, the detecting device may be left open in the delivery position in order to be able to subsequently receive contacts and cables connected to these contacts. After wiring the connector, the detecting element the position of the pawl is closed again by displacing it toward its closed position.

The pawl is flexible between a retracted position in which the detecting element does not interact with the pawl during the displacement of the detecting device from the delivery position to the use position and a protruding position in which the detecting element interacts with the pawl during a displacement of the detecting device from the delivery position to the use position.

When a contact or contact carrier module is incorrectly positioned in its housing, the pawl corresponding to the locking of this contact or this contact carrier module remains in the protruding position. Thus, it is able to block the displacement of the detecting device the position of the pawl.

An object of the invention is to remedy at least partially the drawbacks of the connectors of the prior art comprising a detecting device for detecting the position of a pawl.

To this end, a connector is provided with a detecting device configured to detect the position of a pawl, in which the detecting device is blocked by the pawl in its protruding position between at least two surfaces of the detecting device. These two surfaces are, for example, oriented differently. Thus, the pawl and the detecting device are interlocked without it being necessary to add an additional device or element.

For example, the detecting device blocks the pawl in the protruding position by the pawl being subjected to shear between a first blocking surface located on the detecting element and a second blocking surface located, also on the detecting device, laterally relative to the detecting element, oriented along its dimension parallel to the closing direction. This second blocking surface may possibly be at right angles to the plane of deflection of the pawl in order to form an end of travel stop. The term "laterally" in this document is used to denote a position located on the side of the element under consideration and substantially on a line parallel to the closing direction. Alternatively, so that the stresses exerted on the pawl are symmetrical (for example in order to avoid torsional stress about its longitudinal direction) the detecting device blocks the pawl in the protruding position by the pawl being subjected to shear between a first blocking surface located on the detecting element and two blocking surfaces located on the detecting device, respectively on either side of the detecting element, laterally relative to the detecting element, oriented in its dimension parallel to the closing direction.

The connector may also include one or other of the following features considered independently of one another or in combination with one or several others:

the detecting element interacts with the pawl before at least one blocking surface of the detecting device, located laterally relative to the detecting element, interacts with the pawl during the relative displacement of the detecting device in relation to the housing in the closing direction, from the delivery position to the use position; advantageously a blocking surface of the detecting device, located laterally relative to the detecting element, may cover a tooth located at the end of the pawl (for example on the side thereof) without necessarily interacting therewith, so as to avoid excessive deflection of the pawl as soon as the detecting device interacts therewith;

the pawl includes a chamfered surface in order to interact with the detecting element and a stop located laterally relative to the chamfered surface in order to interact with a zone of the detecting device which is separate from the detecting element itself;

the pawl may be displaced into the protruding position by a contact carrier module inserted into the housing;

the pawl may be displaced into the protruding position by a contact inserted into the housing; in this case in particular a plurality of elements for detecting may be located on a row which is itself interposed between two rows of contacts and two rows of pawls and at least one of the elements for detecting includes two surfaces in order to interact with two pawls, each located respectively in a row of pawls located on either side of the row of elements for detecting;

the pawl may be at least partially housed in a cavity of the detecting device when it is blocked thereby in the protruding position.

The invention further relates to a method for mounting such a connector. It relates to a method for mounting a connector for motor vehicles having a housing comprising at least one pawl and a detecting device, the pawl being flexible between a retracted position in which the detecting element does not interact with the pawl during a displacement of the detecting device from the delivery position to the use position and a protruding position in which the detecting element interacts with the pawl during a displacement of the detecting device from the delivery position to the use position, and the detecting device comprising a detecting element the position of the pawl, in which the detecting device the position of the pawl is displaced in a closing direction between a delivery position and a use position, and the detecting device is blocked by the pawl between at least two surfaces of the detecting device when the pawl is in the protruding position.

BRIEF DESCRIPTION OF THE SEVERAL VIEWS OF THE DRAWING

The present invention will now be described, by way of example with reference to the accompanying drawings, in which:

FIG. 7 is a perspective top view of the detecting element, when the detecting device the position of the pawl is mounted on a housing according to the first embodiment of the invention;

FIG. 8 is a perspective sectional view of the detecting element, when the detecting device the position of the pawl is mounted on a housing according to the first embodiment of the invention;

FIG. 9 is a perspective longitudinal sectional view of a portion of the pawl according to the first embodiment of the invention;

FIG. 10 is a perspective top view of a portion of the detecting device the position of the pawl interacting with the corresponding pawl according to the first embodiment of the invention;

FIG. 11 is a perspective top view of a portion of the detecting device the position of the pawl interacting with the corresponding pawl according to the first embodiment of the invention;

In these figures the same reference numerals are used to denote elements which are identical or similar.

DETAILED DESCRIPTION OF THE INVENTION

The invention is illustrated hereinafter in two different embodiments. A first non-limiting example of a connector 1 is illustrated in FIGS. 1 through 11.

Figure 1:
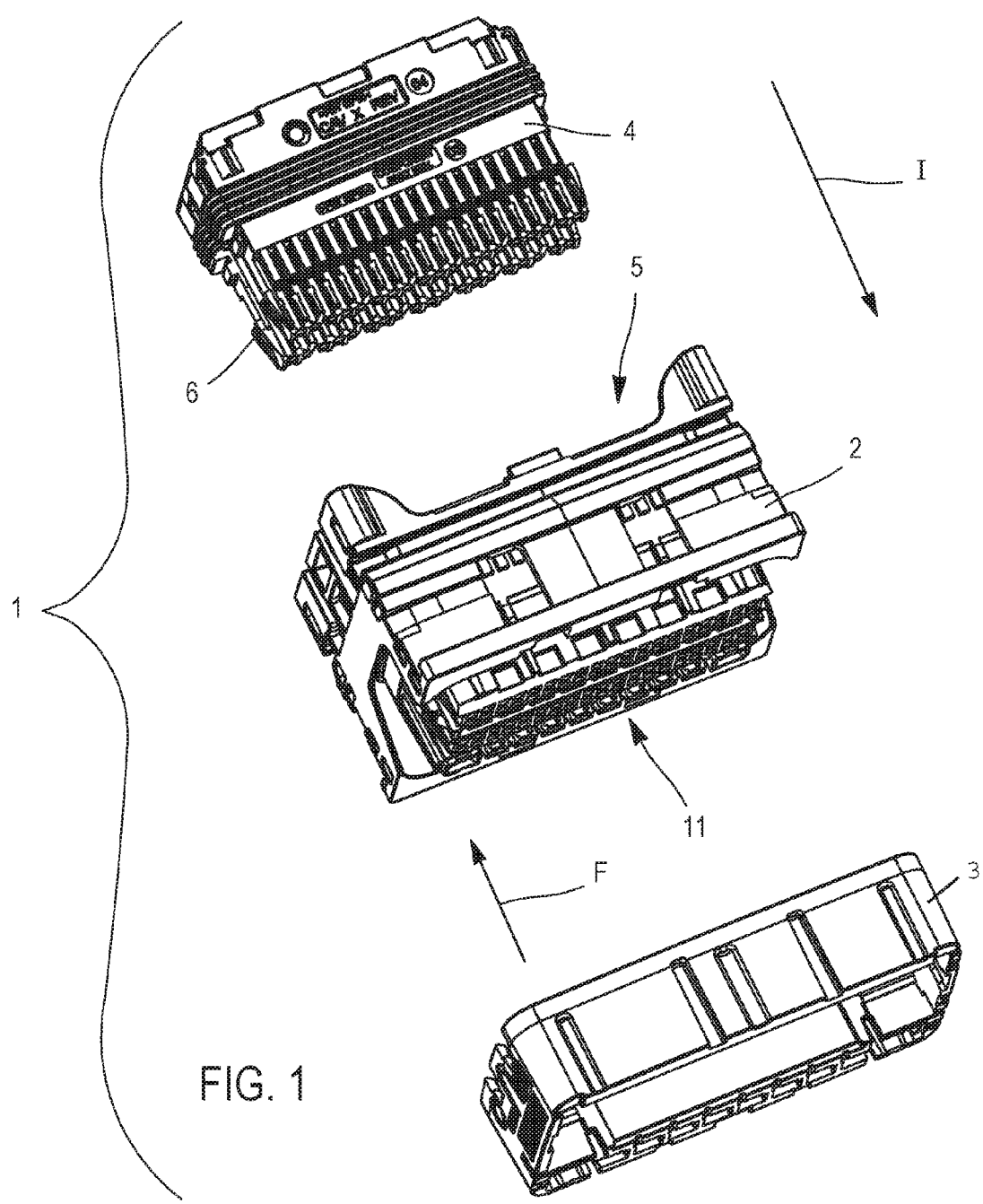
FIG. 1 is an exploded perspective view a connector according to a first embodiment of the invention.

According to the first example, the connector 1 includes a housing 2, a detecting device 3, and two contact carrier modules 4 (see FIG. 1). Lateral clips for assisting the coupling of the connector 1 to a counter-connector may advantageously complement, in the known manner, the embodiment shown here, although they are not shown in the figures. The two contact carrier modules are inserted into the housing 2 through the rear face 5 thereof, in a direction of insertion I. Once correctly inserted into the housing 2, the two contact carrier modules 4 are housed and retained in the housing 2 using a primary locking means (see FIG. 2). The primary locking means on each contact carrier module 4 include at least one ramp 6 terminated by a stop 7 (in the example disclosed here, each contact carrier module 4 includes two ramps 6 and two stops 7 on two of its faces which oppose one another and which are parallel to the direction of insertion I). In the example described here, each contact carrier module 4 has a total of four ramps 6 and four stops 7. Moreover, the primary locking means include at least one pawl 8 made from the same material as the housing 2. In the embodiment shown here, each pawl 8 is substantially formed from a flexible tab extending in a plane of symmetry passing through an opposing pawl, parallel to the direction of insertion I between one free end 9 and a portion connected to the housing 2. The free end 9 includes two teeth 10, each extending laterally and perpendicular to the plane of symmetry indicated above (see also FIG. 7).

The housing 2 includes, for example, four pawls 8 if it is designed to receive two contact carrier modules 4. Thus, each contact carrier module 4 is retained in the housing 2 by two pawls 8, each respectively interacting with two ramps 6 when inserting a contact carrier module 4 into the housing 2 and with two stops 7 after the insertion of this contact carrier module 4 into the housing 2, so as to retain the contact carrier module 4 in the locked position in the housing 2.

Figure 2:
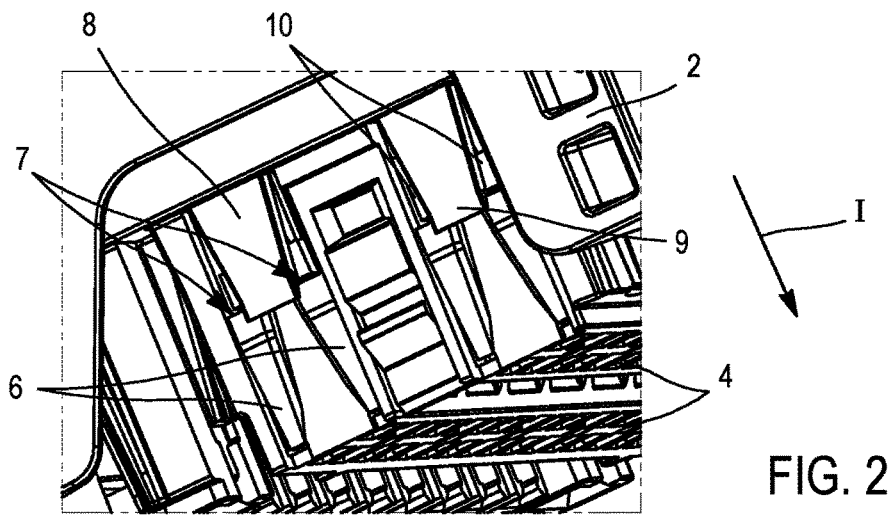
FIG. 2 is an enlarged perspective view of a part of the connector of FIG. 1 with two contact carrier modules inserted into the housing and, for greater clarity, without the detecting device the position of the pawl according to the first embodiment of the invention.
Figures 3A, 3B:
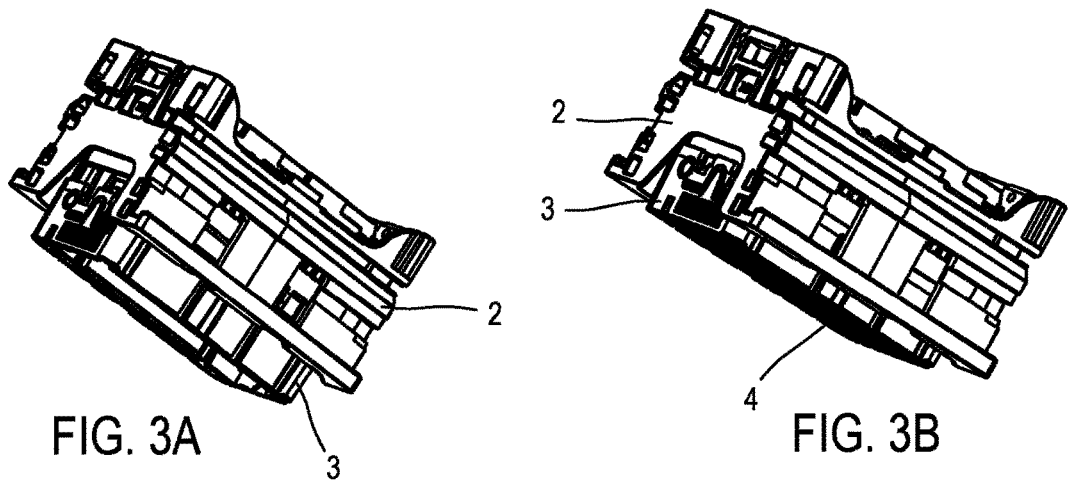
FIGS. 3A and 3B are perspective views of the connector of FIG. 1, once mounted, with the detecting device the position of the pawl respectively in the delivery position and in the use position according to the first embodiment of the invention.

During the insertion of a contact carrier module 4 in the housing 2, the ramps 6 raise the corresponding teeth 10 to lift the free end 9 of a pawl 8 until each tooth 10 retracts behind the respective stop 7 of the contact carrier module 4 thus inserted, and until the teeth 10 of each pawl 8 and the stops 7 of each contact carrier module 4 cooperate to retain the contact carrier module 4 in the housing 2 (see FIGS. 2 and 7).

The detecting device 3 is inserted into the housing 2 by the front face 11 thereof (see FIG. 1). The detecting device 3 is moveable and slides into the housing 2 in a closing direction F opposing the direction of insertion I between a delivery position (see FIG. 3A) and a use position (see FIG. 3B). The detecting device 3 is held in a stable manner in each of these positions by appropriate means. The detecting device 3 further includes a detecting element 12 configured to detect the position of the pawl for each pawl 8 (see FIGS. 4 to 8).

If a contact carrier module 4 is incorrectly inserted into the housing 2, a tooth 10 of a pawl 8 remains on a ramp 6. This tooth 10 is not retracted behind the corresponding stop 7 of the contact carrier module 4. The contact carrier module 4 is thus not correctly held in the housing 2 but the operator handling the connector 1 is warned of this when attempting to displace the detecting device 3 from its delivery position into its use position. More specifically, the tooth 10 remaining on the ramp 6 and thus protruding, interacts with the detecting element 12 the position of the pawl 8 and blocks this displacement.

Figures 4, 5, 6:
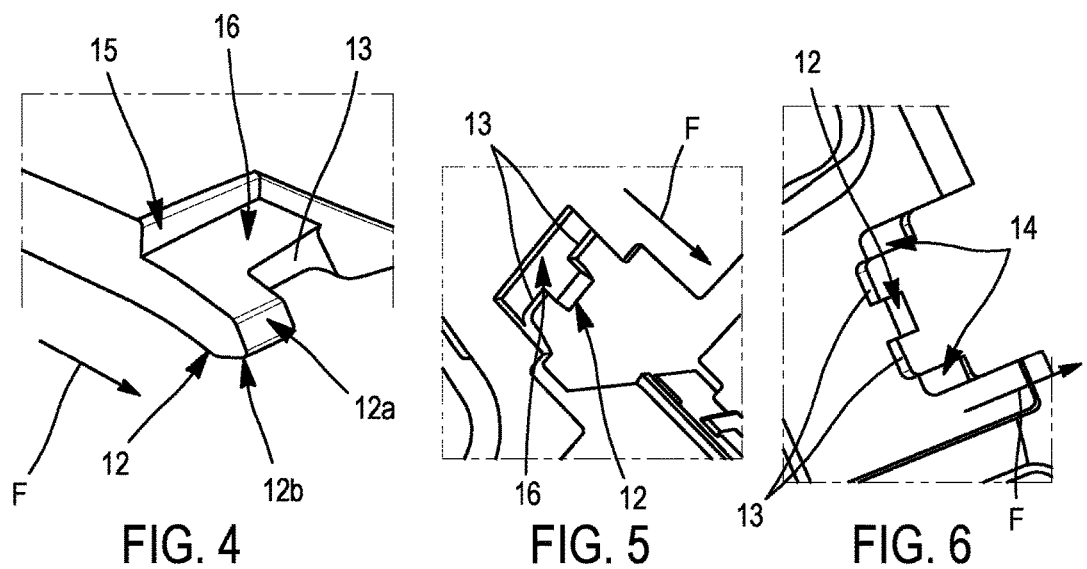
FIG. 4 is perspective section view of a portion of the detecting device the position of the pawl, with its detecting element according to the first embodiment of the invention.
FIG. 5 is a perspective top view of the detecting element, when the detecting device the position of the pawl is not yet mounted on a housing according to the first embodiment of the invention.
FIG. 6 is a perspective bottom view of the detecting element, when the detecting device the position of the pawl is not yet mounted on a housing according to the first embodiment of the invention.

More specifically, the detecting device 3 includes several types of blocking surfaces: end of travel stops 13, chamfers 14 and an edge 15 of a cavity 16 (see FIGS. 4 and 6). These blocking surfaces are defined by two of the lateral walls of the detecting device 3. The detecting device 3 includes, for example, a pair of end of travel stops 13 for each pawl 8. The end of travel stops 13 are located on a plane perpendicular to the plane of deflection of the pawl 8. Each end of travel stop 13 of a pair of end of travel stops is respectively located on either side of the detecting element 12, laterally relative to the detecting element 12, oriented along its dimension parallel to the closing direction F. The detecting element 12 the position of the pawl 8 thus extends in the closing direction F, between the two end of travel stops 13.

The detecting element 12 permits, when a contact carrier module 4 is incorrectly clipped onto the housing 2, in the insertion direction I, the free end 9 of the pawl 8 to be raised so that it is housed in the cavity 16 provided to this end in the wall of the detecting device 3. Then the blocking is successively carried out first by progressive shear between the internal face of the housing 2 which retains the free end 9 of the pawl 8 and the chamfers 14 for retaining the stop surfaces 10a of the teeth 10, in the reduced space represented by the thickness of the wall of the detecting device 3, then by abutment in the direction F between the end of travel stops 13 of the detecting device 3 and the stops 17 of the teeth 10 for retaining the contact carrier module 4 (see also FIG. 9).

Thus, when the pawl 8 interacts with a detecting element 12 it is raised thereby and blocked symmetrically on either side of the detecting element 12 by the blocking surfaces 13, 14 and 15.

The interaction of the detecting device 3 and the pawl 8 is described in a more detailed manner in relation to FIGS. 4 to 11.

As may be seen in particular in FIG. 4, the detecting element 12 is in the form of a chamfered tooth. This chamfered tooth includes a surface 12a which is inclined relative to the closing direction F, extending from its free end and oriented toward the outside of the connector 1 in addition to a surface 12b which is inclined relative to the closing direction F, extending from its free end and oriented toward the inside of the connector 1. The surface 12a oriented toward the outside of the connector 1 thus tends to separate the pawl 8 toward the outside of the connector 1 when the detecting device 3 is displaced from its delivery position towards its closed position and the corresponding contact carrier module 4 is incorrectly locked in the housing 2 (see FIGS. 10 and 11).

As may be seen, in particular in FIGS. 5 to 8, the detecting element 12 is positioned appropriately to detect the corresponding pawl 8 when the contact carrier module 4, which it should lock, is not correctly locked. For example, as shown in FIG. 6 in particular, the detecting element 12 is positioned to the rear (relative to the closing direction F) in relation to the two chamfers 14 which are each respectively located inside the wall of the detecting device 3 (i.e. on its face turned toward the housing 2). Thus, the detecting element 12 interacts with the pawl 8 when the contact carrier module 4 is incorrectly clipped in the insertion direction I and drives the free end 9 of the pawl 8 into the housing 2 before the chamfers 14 located laterally relative to the detecting element 12 interact with the teeth 10 of the pawl 8 during the relative displacement of the detecting device 3 in relation to the housing 2, in the closing direction F, from the delivery position to the use position. However, when the detecting element 12 starts to interact with the free end 9 of the pawl 8, the teeth 10 are covered by the chamfers 14 in the closing direction F to avoid an exaggerated deflection of the pawl 8.

These retaining chamfers 14 are located on either side of the end of travel stops 13 (starting from the detecting element 12, see in particular FIG. 6). These chamfers 14 serve to bring back and maintain the teeth 10 in the direction of the inside of the connector 1, the teeth being located on either side of the pawl 8 even if the pawl is raised by the detecting element 12 (see FIGS. 7, 10 and 11). The chamfers 14 thus also form blocking surfaces.

During the displacement of the detecting device 3 from its delivery position to its use position, if a tooth 10 of a pawl 8 remains on a ramp 6 due to an incomplete insertion of the contact carrier module 4, the pawl 8 is raised. Its free end 9 includes a chamfered surface 18 (see FIG. 9) which is designed, on the one hand, to receive a tool for dismantling the contact carrier module 4 to separate the pawls 8 and, on the other hand, to permit the detecting element 12 to be inserted below the pawl 8 if the corresponding contact carrier module 4 is incorrectly clipped in. In this last case, the chamfered surface 18 thus interacts with the detecting element 12 and passes over the surface 12a (see FIG. 4). However, the teeth 10 located below the free end 9 of the pawl 8 (closer to the housing 2) are already below the chamfers 14 and remain inserted below the wall of the detecting device 3. The teeth 10 each include a stop 17 located laterally relative to the chamfered surface 18 (see FIG. 9) to interact with an end of travel stop 13 of the detecting device 3 separate from the detecting element 12. Thus the pawl 8 is subjected to shear between, on the one hand, its free end 9 which tends to be separated toward the outside of the connector 1 by the detecting element 12 and the inside face of the housing of the cavity 16 and, on the other hand, the teeth 10 located on either side of the pawl 8, which are instead brought inside the connector 1 due to the stop surfaces 10a held inside the detecting device 3 by the chamfers 14 produced in the wall thereof.

Moreover, as the teeth 10 located on either side of the pawl 8 each include a stop surface 17 substantially perpendicular to the closing direction F and substantially parallel to the blocking surfaces 13 located on the detecting device 3 (see FIG. 9) if a contact carrier module 4 is incorrectly inserted in the housing 2, the stop surfaces 17 interact with the blocking surfaces 13 in order to block completely the displacement of the detecting device 3 from its delivery position into its use position (see FIGS. 10 and 11).

By these arrangements the pawl 8 is thus subjected to greater stress in its longitudinal direction than in the region of its joint with the housing 2 where it would be fragile if it were subjected to high flexural stress.

Moreover, if the contact carrier modules 4 are correctly inserted and correctly housed in the housing 2, the pawls 8 are retracted and the detecting device 3 may be displaced from its delivery position to its use position, without being blocked by a pawl 8. The pawls 8 are thus inserted below the wall of the detecting device 3 which thus prevents the pawls 8 from separating or being separated and thus inadvertently releasing a contact carrier module 4. The detecting device 3 thus provides secondary locking means.

When the detecting device 3 is locked before the insertion of a contact carrier module 4, its internal wall prevents the pawls 8 from opening. As a result, the operator is obliged to reopen the detecting device 3 to insert the contact carrier module 4, which guarantees that the detecting function is correctly used, even in the case of error in the method for carrying out the mounting of the connector.

A second non-limiting example of the electrical connector 100 is illustrated in FIGS. 12 to 20.

This second embodiment may be implemented in an electrical connector 100 comprising a housing 20 and a detecting device 50. In contrast to the first embodiment, the contacts 21 of the electrical connector 100 are not substantially housed in a contact carrier module but instead between the housing 20 and the detecting device 50 which complements the cavities 22 for the housing of the contacts 21.

Figure 12:
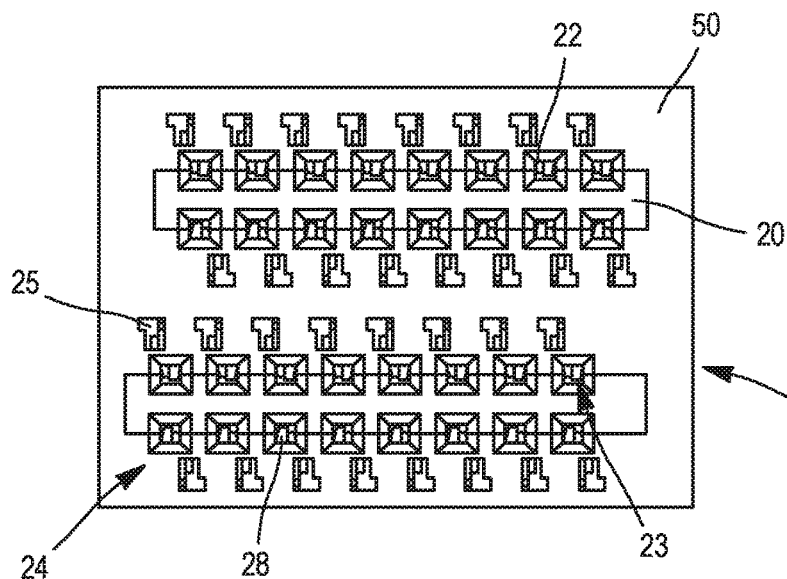
FIG. 12 is a front view (from its face for coupling with a counter-connector) of a connector according to a second embodiment of the invention.

In the example shown, in particular, in FIG. 12, in the position of use, the detecting device 50 complements the cavities 22 and the openings 23 of its cavities 22 formed on the front face 24 of the electrical connector 100. Openings 25 for the introduction of a tool permitting the pawls 28 to be raised and the contacts 21 to be released (not shown in FIG. 12) are also present on this front face 24 to correct an inversion in the position of one of the contacts, for example.

Figure 13:
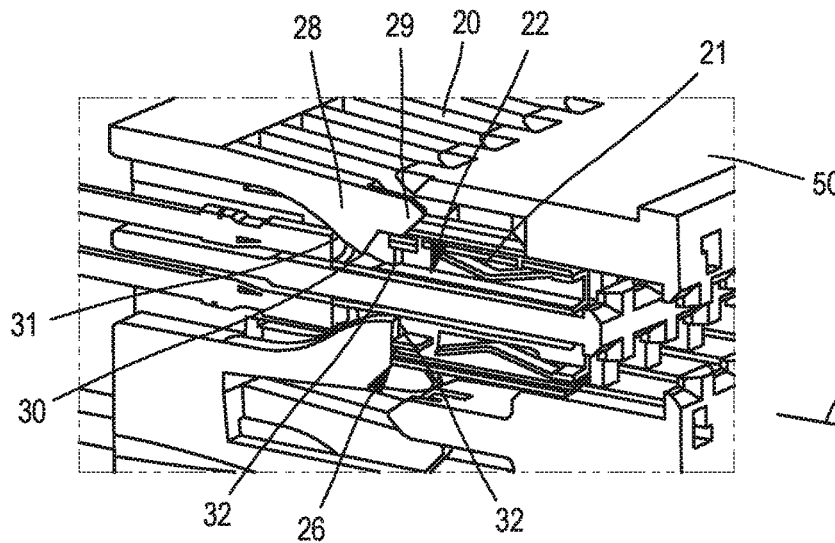
FIG. 13 is a perspective longitudinal sectional view passing through a cavity for receiving a contact, a portion of the housing and the detecting device the position of the pawl of the embodiment of FIG. 12, the detecting device the position of the pawl being in the delivery position according to the second embodiment of the invention.
Figure 14:
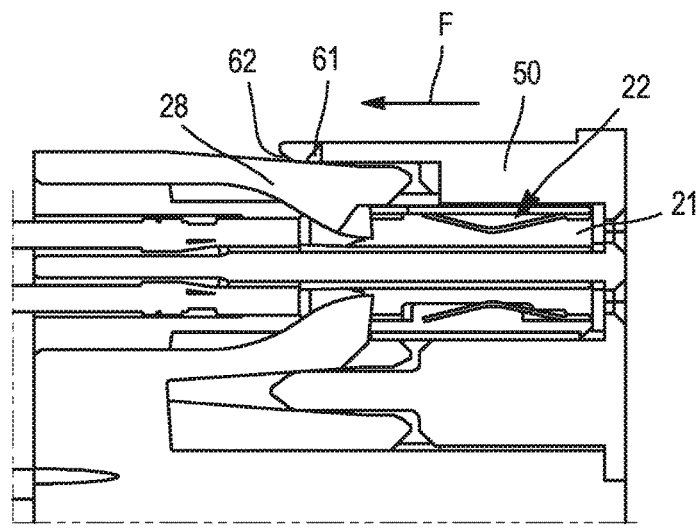
FIG. 14 is a perspective longitudinal sectional view passing through a cavity for receiving a contact, the portion of the connector of FIG. 13, the detecting device the position of the pawl being in the use position according to the second embodiment of the invention.

As shown in FIGS. 13 and 14, the housing 20 includes pawls 28 to retain the contacts 21 in the housing 20. The contacts 21 are inserted in an insertion direction I into the cavities 22 formed in the electrical connector 100. More specifically, as illustrated in these figures, each cavity 22 includes a plurality of internal faces (for example a part of the front stop of the contact 21, the base on which it rests and a face of the pawl 28) located on the housing 20 and other internal faces located on the detecting device 50 (for example a further part of the front stop of the contact 21, a wall opposite the base, the geometry thereof being able to be complementary to the shape of the upper face of the contact 21 in order to provide locating means and guaranteeing the correct orientation of the contact in its cavity). Each pawl 28 is substantially formed by a flexible tab extending parallel to the direction of insertion I between a free end 29 and a portion connected to the housing 20. In the known manner, each pawl 28 includes, for example in the region of its free end 29, a tooth 30 comprising a ramp 31 and a stop 32. The pawl 28 also includes a chamfer 33 (see FIG. 19) with a surface oriented toward the outside of the corresponding cavity 22. The chamfer 33 is arranged laterally relative to a tip 34. The ramp 31 interacts with a contact 21 when inserting the contact in a cavity 22 which makes it possible to separate the pawl 28 which returns elastically into the resting position when the contact 21 is correctly housed in its cavity 22 and, on the one hand, the stop 26 of the contact 21 and the stop 32 of the pawl 28 and, on the other hand, the rib 27 of the contact 21 and the stop 32 of the pawl 28 cooperate to retain the contact 21 in its cavity 22 if a tractive force tends to remove it from the cavity (see FIG. 13). Each pawl 28 thus contributes to a primary locking of the contact 21 in its cavity 22.

When each contact 21 is correctly housed in its cavity 22 and locked by a pawl 28, the detecting device 50 may be displaced from its delivery position (see FIG. 13) into its use position (see FIG. 14) in a closing direction F. As may be seen in FIG. 14, in the closed position, the detecting device 50 covers the pawl 28 and blocks it in engagement with the contact 21. The detecting device 50 thus forms secondary locking means.

The so-called "detecting device" 50 referred to in this document is sometimes also called a Terminal Position Assurance (TPA) device or Primary Lock Retention (PLR) device.

Figure 15:
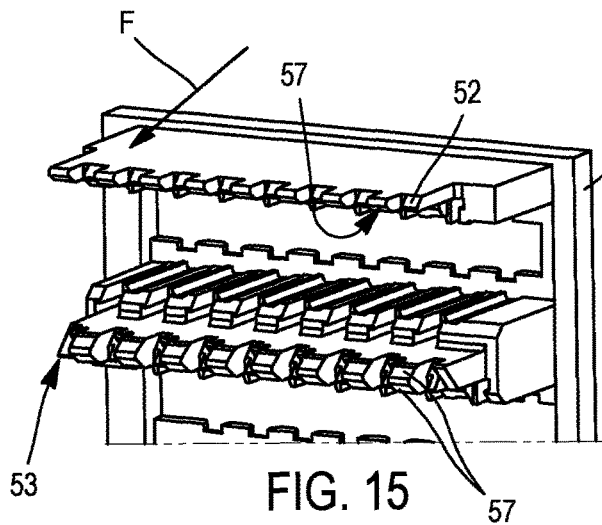
FIG. 15 is a perspective side view opposing the front face of a portion of the detecting device the position of the pawl of FIGS. 12 to 14 according to the second embodiment of the invention.
Figure 16:
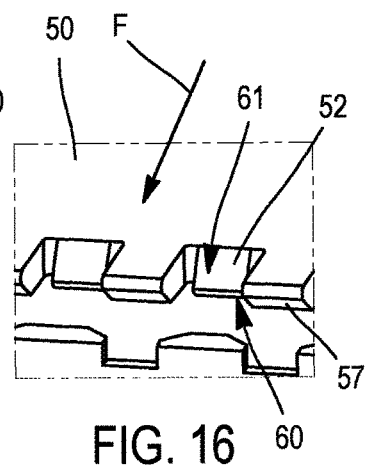
FIG. 16 is an enlarged perspective view of a portion of the detecting device the position of the pawl of FIG. 15 according to the second embodiment of the invention.

As shown in FIGS. 15 and 16, the detecting device 50 includes elements for detecting 52 and blocking surfaces 57. Each detecting element 52 is in the form of a chamfered tooth 60. This chamfered tooth 60 includes a surface 61 which is inclined relative to the closing direction F extending as far as a free end and oriented toward the outside of the cavity 22 (see also FIGS. 13 and 14). When the detecting device 50 is displaced from its delivery position toward its closed position and a contact 21 is incorrectly inserted into its cavity 22, this surface 61 interacts with the incline 38 of the pawl 28 and tends to separate the pawl 28 toward the outside of the corresponding cavity 22 (see FIG. 17). On the side of each chamfered tooth 60 the detecting device 52 includes a blocking surface 57 which is inclined relative to the closing direction F and oriented toward the inside of the cavity 22 (see FIG. 16). This blocking surface 57 thus tends to retain the pawl 28 toward the inside of the corresponding cavity 22 (see also FIG. 19) when the detecting device 50 is displaced from its delivery position toward its closed position and the contact 21, in a cavity 22, is incorrectly locked in the housing 20.

As may be seen in particular in FIGS. 13 to 17, the detecting element 52 is located to the rear (in the closing direction F) relative to the adjacent blocking surface 57, and the tip of the free end 29 is in an advanced position relative to the tooth 30 on the pawl 28. More particularly, therefore, the chamfer 33 is already covered by the corresponding blocking surface 57, in the closing direction F, at the time when the surface 61 starts to interact with the incline 38 at the free end 29 of the pawl 28. This makes it possible to prevent the pawl 28 from being subjected to a level of flexural stress which is too high at its base connected to the housing 20.

Figure 17:
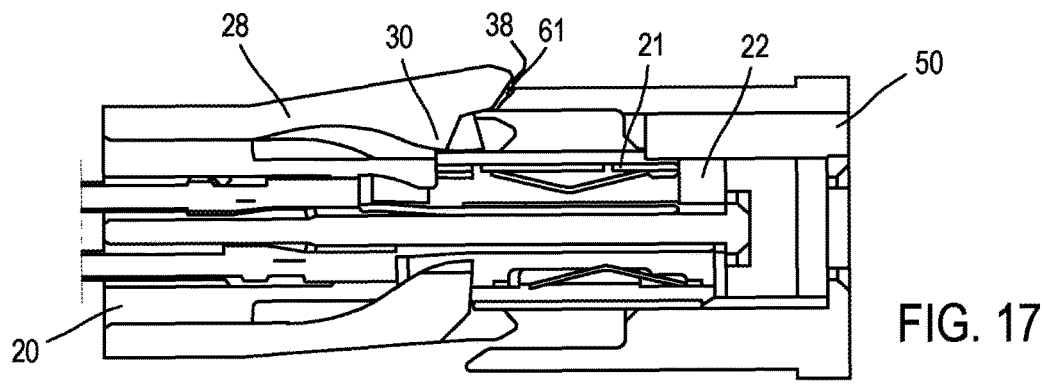
FIG. 17 is a perspective longitudinal sectional view similar to FIG. 14 of a variant having only two rows of contacts; the detecting device the position of the pawl being in the delivery position according to the second embodiment of the invention.
Figure 18:
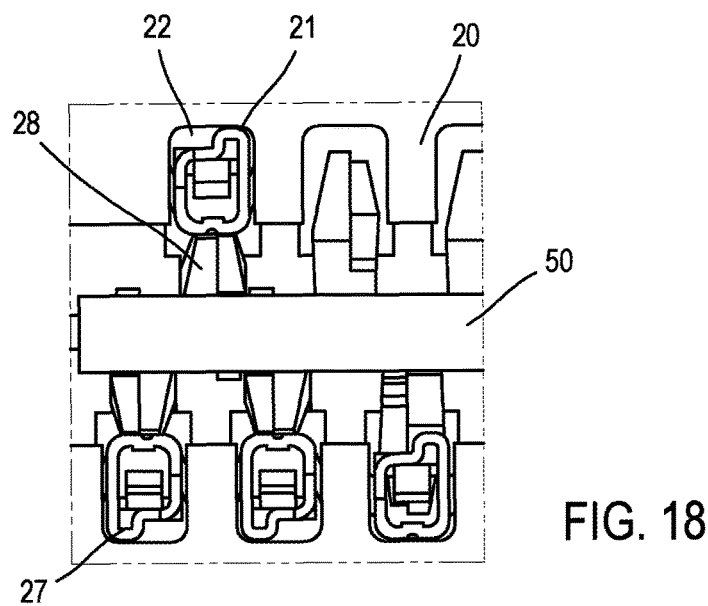
FIG. 18 is a cross section view passing through the cavities for receiving a contact, a portion of the connector of FIGS. 13 and 14 with three contacts inserted in reverse in their respective cavity according to the second embodiment of the invention.
Figure 19:
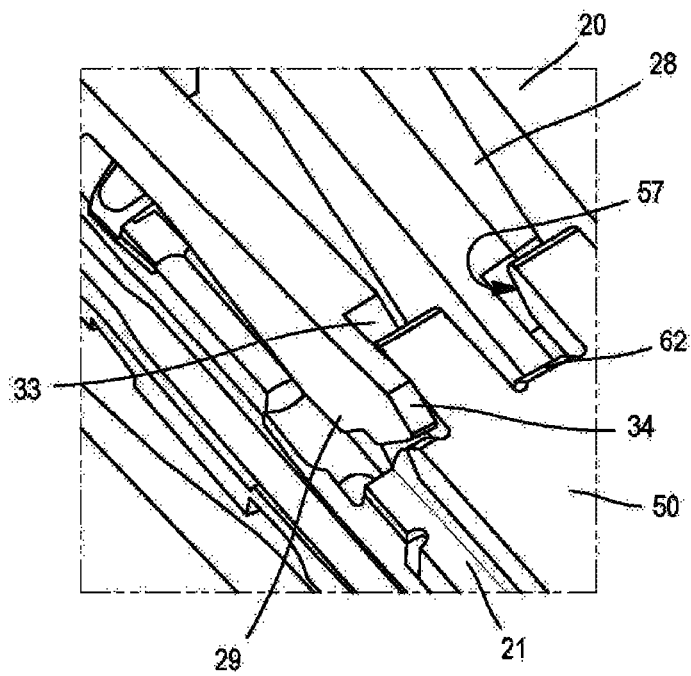
FIG. 19 is a perspective top cross sectional view of a portion of the connector of FIGS. 13 and 14 with the detecting device the position of the pawl blocked by two pawls which are raised by contacts which are incorrectly inserted in their respective cavity according to the second embodiment of the invention.

If a contact 21 is not correctly housed in its cavity 22 (for example, if it is not completely inserted as illustrated in FIG. 17 or if it is inserted back to front, as illustrated by FIG. 18) the tooth 30 of the pawl 28 remains raised by this contact 21 and the detecting device 50 is blocked when displaced from its delivery position to its use position. In particular, the pawl 28 is subjected, on the one hand, to stress by the surface 61 which tends to separate it from the cavity 22 (see FIG. 17). On the other hand, it is blocked due to the interaction of the blocking surface 57 of the detecting device 50 with the chamfer 33 of the pawl 28 (see FIG. 19). The pawl 28 is thus subjected to shear between its free end 29 which tends to be separated toward the outside of the cavity 22 and the chamfer 33 located to the side relative to the free end 29 of the pawl and which tends to be pushed back toward the interior of the cavity 22 by the blocking surface 57. The behaviour relative to this shear force may be further improved by the cooperation of the detecting element 52 with the lateral walls of the cavity 22.

The detecting device 50 for detecting the position of the pawls 28 may include a plurality of elements for detecting 52 located on a row 53 which is itself interposed between two rows of contacts and two rows of pawls (see FIG. 15). On this row 53 each detecting element 52 includes two surfaces 61 for interacting with two pawls 28, each located respectively in a row of pawls 28 located on either side of the row 53 of elements for detecting 52. On the side of each detecting element 52 are located two blocking surfaces 57 for interacting with two pawls, each respectively located in a row of pawls 28 located on either side of the row 53 of elements for detecting 52. According to a variant, not shown, a slot may optionally be formed in the region of the central longitudinal zone of the row 53 (between the blocking surfaces 57 which in this case are thus more separated). Protective walls for the contacts of a counter-connector are designed to be inserted into this slot (these walls are called "scoop proof" since they protect the male contacts of the counter-connector from possible deformations).

Figure 20A:
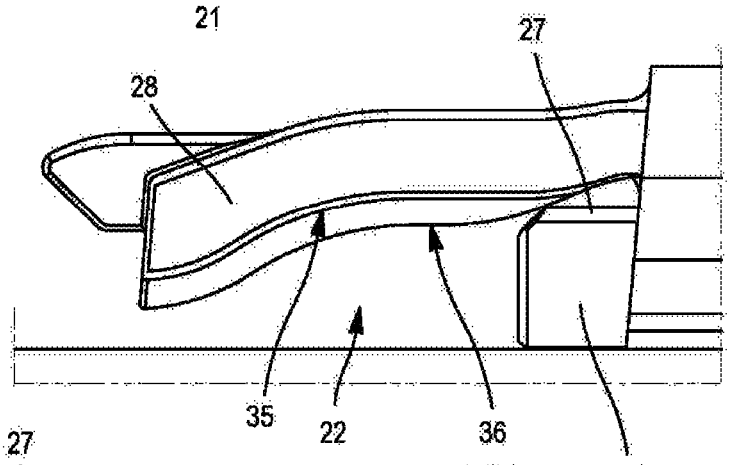
FIGS. 20A and 20B are top and front views of a pawl and a contact inserted (partially in FIG. 20A and fully in FIG. 20B) in a cavity according to the second embodiment of the invention.
Figure 20B:
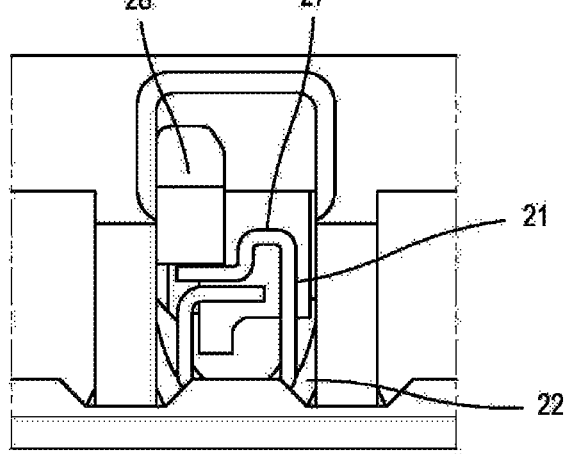

As illustrated in FIGS. 18, 20A and 20B, the contact 21 advantageously includes a locating rib 27. In order to avoid a deformation of the pawl 28 in torsion around its longitudinal axis during its insertion into a cavity 22, the pawl 28 includes a bearing surface 35 extending substantially over its entire length parallel to its lower surface 36. Thus, during the insertion of the pawl 28 in a cavity 22, the lower surface 36 rests on the upper wall of the contact and the bearing surface 35 rests on the rib 27. The profile of the bearing surface 35 and lower surface 36 is optimized and adapted so as to create just one force peak upon the insertion of the contact 21. More specifically, a double-click sensation (which would correspond to two force peaks) is to be avoided, in order to avoid the occurrence of incorrectly clipped-in contacts.

While this invention has been described in terms of the preferred embodiments thereof, it is not intended to be so limited, but rather only to the extent set forth in the claims that follow. Moreover, the use of the terms first, second, primary secondary, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

I claim:

1. An electrical connector, comprising:
a housing having a pawl;
a contact carrier module secured to the housing by said pawl; and
a detecting device which is movable relative to the housing in a closing direction between a delivery position and a use position, said detecting device comprising a detecting element configured to detect a position of the pawl, wherein the pawl is flexible between a retracted position in which the detecting element does not interact with the pawl during a displacement of the detecting device from the delivery position to the use position and a protruding position in which the detecting element interacts with the pawl during the displacement of the detecting device from the delivery position to the use position and wherein the detecting device is blocked by the pawl in the protruding position between at least two surfaces of the detecting device.

2. The electrical connector according to claim 1, wherein the pawl includes a chamfered surface in order to interact with the detecting element and a stop located laterally relative to the chamfered surface in order to interact with a zone of the detecting device which is separate from the detecting element.

3. The electrical connector according to claim 1, wherein the pawl is displaced into the protruding position by a contact carrier module inserted into the housing.

4. The electrical connector according to claim 1, wherein the detecting device blocks the pawl in the protruding position by subjecting said pawl to shear between a first blocking surface located on the detecting element and a second blocking surface located on the detecting device, laterally relative to the detecting element, oriented along its dimension parallel to the closing direction.

5. The electrical connector according to claim 4, wherein the detecting device blocks the pawl in the protruding position by said pawl being subjected to shear between the first blocking surface located on the detecting element and two blocking surfaces located on the detecting device, respectively on either side of the detecting element, laterally relative to the detecting element, oriented in its dimension parallel to the closing direction.

6. The electrical connector according to claim 4, wherein the detecting element interacts with the pawl before at least one blocking surface of the detecting device located laterally relative to the detecting element interacts with the pawl during a relative displacement of the detecting device in relation to the housing, in the closing direction from the delivery position to the use position.

7. The electrical connector according to claim 1, wherein the pawl is displaced into the protruding position by a contact inserted into the housing.

8. The electrical connector according to claim 7, wherein a plurality of elements for detecting are located on a row which is itself interposed between two rows of contacts and two rows of pawls and at least one of the elements for detecting includes two surfaces in order to interact with two pawls, each located respectively in a row of pawls located on either side of the row of detecting elements.

9. The electrical connector according to claim 7, wherein the pawl is at least partially housed in a cavity of the detecting device when it is blocked thereby in the protruding position.

\* \* \* \* \*